United States Patent
Andresen et al.

(10) Patent No.: US 8,810,211 B2
(45) Date of Patent: Aug. 19, 2014

(54) ELECTRICAL POWER CONVERTING DEVICE AND METHOD TO ACCOMMODATE VOLTAGE VARIATIONS IN ELECTRICITY NETWORKS

(75) Inventors: Björn Andresen, Ostbirk (DK); Steffen Wulff, Bremen (DE)

(73) Assignee: Siemens Aktiengesellschaft, Munich (DE)

( * ) Notice: Subject to any disclaimer, the term of this patent is extended or adjusted under 35 U.S.C. 154(b) by 352 days.

(21) Appl. No.: 13/005,743

(22) Filed: Jan. 13, 2011

(65) Prior Publication Data

US 2011/0210706 A1 Sep. 1, 2011

(30) Foreign Application Priority Data

Jan. 14, 2010 (EP) .................................. EP10000321

(51) Int. Cl.
*G05F 1/70* (2006.01)

(52) U.S. Cl.
USPC ........................................ 323/207

(58) Field of Classification Search
CPC ........... H02M 5/42; H02M 5/46; H02M 5/48; H02M 1/42; G05F 1/70
USPC ............... 323/205, 207, 208; 290/44; 363/37; 700/292, 293
See application file for complete search history.

(56) References Cited

U.S. PATENT DOCUMENTS

| 6,448,735 | B1 | 9/2002 | Gokhale et al. |
| 7,595,563 | B2 * | 9/2009 | Wobben .................... 290/44 |

FOREIGN PATENT DOCUMENTS

| DE | 19961705 A1 * | 7/2001 |
| EP | 1386078 B1 | 3/2005 |
| EP | 1906505 A1 * | 4/2008 |
| FR | 2823381 A1 | 10/2002 |

OTHER PUBLICATIONS

M. Tsili, S. Papathanassiou: "A review of grid code technical requirements for wind farms", IET Renewable Power Generation, 2009; vol. 3, No. 3, pp. 308-332.

* cited by examiner

Primary Examiner — Adolf Berhane
Assistant Examiner — Jye-June Lee

(57) ABSTRACT

A converter device for power conversion in a power plant, such as a wind turbine, is provided. The converter device is configured for converting an electrical input power to an electrical output power. The converter device may be configured for receiving mechanical input power or, according to another embodiment, may be configured for receiving electrical input power. The converter device includes a voltage input for receiving a voltage signal, which is indicative of a voltage in a electricity network to which the converter device is coupled during operation in order to provide the electrical output power to the electricity network The converter device includes a controller being configured for setting a reactive component of the electrical output power depending on the voltage signal according to a out-of-band reactive current gradient if the voltage indicated by the voltage signal is outside a predetermined voltage band.

12 Claims, 2 Drawing Sheets

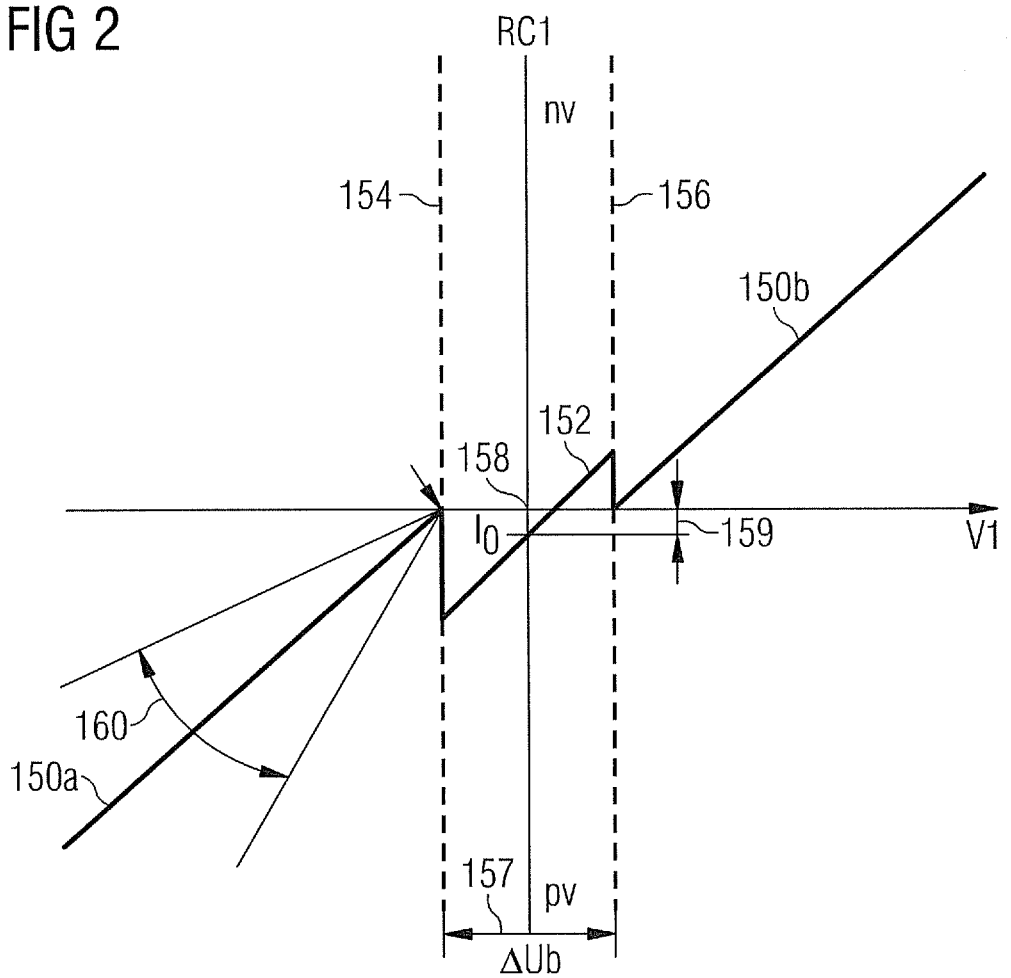

ELECTRICAL POWER CONVERTING DEVICE AND METHOD TO ACCOMMODATE VOLTAGE VARIATIONS IN ELECTRICITY NETWORKS

CROSS REFERENCE TO RELATED APPLICATIONS

This application claims priority of European Patent Office application No. 10000321.9 EP filed Jan. 14, 2010, which is incorporated by reference herein in its entirety.

FIELD OF THE INVENTION

The present invention relates to the field of converter devices for converting input power into an electrical output power. In particular, the present invention relates to the field of converter devices for wind turbines.

ART BACKGROUND

There are known energy generating devices, which provide a varying power to an electricity network to which they are coupled. For example, a wind turbine provides less power for lower wind speeds. Another example is a solar energy plant, the output power of which depends on the availability and intensity of sunlight. The varying power may lead to voltage disturbances in the electricity network. Further, consumers which take power out of the electricity network may generate disturbances in the electricity network. Other possible faults are lightning, short circuits, etc.

EP 1386 078 B1 discloses a method for operation of a wind energy installation so as to provide a wind turbine or a wind park capable of reducing or at least not significantly increasing the undesired variations of the voltage in an electricity network compared to a situation without the wind turbine. The wind energy installation has an electrical generator, which can be driven by a rotor in order to emit electrical power to an electrical network with a wattless component being fed into the electrical network. The wattless component is predetermined by a phase angle φ, which describes an angle between the current and the voltage of the electrical volt amperes that are fed in, wherein the phase angle φ is varied as a function of the magnitude of at least one voltage, which is detected in the network, such that the phase angle is unchanged provided that the network voltage is between a predetermined lower threshold value and a predetermined upper threshold value, with the lower voltage value being less than a nominal voltage value and the predetermined upper voltage value being greater than a predetermined nominal voltage value. If the predetermined upper voltage value is exceeded or the predetermined lower voltage value is undershot, the magnitude of the phase angle arises as the voltage arises or falls further.

In view of the above described situation, there exists a need for an improved converter device that enables to accommodate voltage variations in an electricity network.

SUMMARY OF THE INVENTION

This need may be met by the subject-matter according to the independent claims. Advantageous embodiments of the herein disclosed subject-matter are described by the dependent claims.

According to a first aspect of the invention, there is provided a converter device for converting an input power to an electrical output power, the converter device comprising a voltage input for receiving a voltage signal, said voltage signal being indicative of a voltage in a electricity network to which the converter device is coupled during operation in order to provide said electrical output power to said electricity network. Further, the converter device comprises a controller being configured for setting a reactive component of said electrical output power depending on said voltage signal according to an out-of-band reactive current gradient if the voltage indicated by the voltage signal is outside a predetermined voltage band. Herein, the out-of-band reactive current gradient is defined as change of reactive component per voltage unit of a change in the voltage indicated by the voltage signal.

According to an embodiment, the reactive component is a reactive current. Other examples of reactive components are reactive power, phase angle or power factor. These reactive components are well-known to those skilled in the art and are not discussed in further detail. Hence, the reactive current may be set by directly setting the reactive current or, according to another embodiment may be set indirectly by setting a reactive component which is in a functional relationship with the reactive current. However, the reactive component is set according to the predetermined reactive current gradient. In other words, the reactive component is set such that the resulting reactive current is, depending on the voltage signal, set according to the predetermined reactive current gradient. This surprisingly results in a more stable network operation of the electricity network.

The predetermined voltage band is sometimes referred to as dead band. According to an embodiment, the electrical system, e.g. the power plant comprises a neutral line in addition to the output at which the desired electrical active and/or reactive current/power is provided.

The voltage signal may be generated in any suitable way. For example, according to an embodiment, the voltage signal is derived from the electrical output provided by the converter device in each of the at least two phases. According to another embodiment, the voltage which is indicated by the voltage signal is the voltage of the respective phase in an electricity network to which the converter is coupled.

According to an embodiment, the converter device is configured for receiving a mechanical input power. For example, according to an embodiment, a converter device may include a doubly fed induction generator, e.g. of the type known from U.S. Pat. No. 6,448,735 B1.

According to another embodiment, the input power is an electrical input power. In other words, according to this embodiment, the converter device is configured for receiving an electrical input power. To this end, the converter device may comprise at least one converter, e.g. a frequency converter, for converting electrical input power into electrical output power. Since in this case the converter device is operates only on the electrical side, it is also referred to herein as electrical converter device.

According to an embodiment, the converter device is a converter device of a wind turbine. According to a further embodiment, the converter device is an electrical converter device of a wind turbine and is thus configured for converting an electrical input power generated by a generator of the wind turbine into an electrical output power.

Generally, the electrical power generated by a generator of electric energy may be preconverted so as to provide the electrical input power of the electrical converter device. The preconversion may be of any suitable type known in the art. For example, a rectifier may be coupled between the output of the generator and the power input of the converter device, which receives the electrical input power.

The predetermined voltage band may be fixedly pre-programmed in the converter device. According to another embodiment, the converter device comprises a control input for receiving at least one voltage band control signal. The converter device may be further configured for setting the predetermined voltage band in response to the received voltage band control signal.

The width of the predetermined voltage band may be in the range from 0% up to 20% of the rated voltage. According to another embodiment, the width of the predetermined voltage band is in the range from 5% to 15% of the rated voltage. According to embodiments, the percentages disclosed herein relate to respective +/− values such that the percentage values denote half of the respective interval. For example, if the rated voltage is 240 V and the width of the predetermined voltage band is 10% of the rated voltage, then the width of the predetermined voltage band amounts to +/−24 V, i.e. the predetermined voltage band is [rated voltage −24 V; rated voltage +24 V]. In other embodiments, the percentage values indicate the whole interval.

According to an embodiment, the predetermined voltage band is centered around the rated voltage. According to other embodiments, the predetermined voltage band is non-symmetrically disposed with regard to the rated voltage.

According to an embodiment, the controller is configured for setting the reactive component of said electrical output power according to an in-band reactive current gradient if the voltage indicated by the voltage signal is inside the predetermined voltage interval, wherein the in-band reactive current gradient is defined as change of reactive component per voltage unit of a change in the voltage indicated by the voltage signal.

Hereinafter a "reactive component gradient" is also referred to as "gradient" for short. According to an embodiment the in-band gradient is constant, i.e. independent of the voltage signal within the predetermined voltage interval. According to other embodiments, the in-band gradient is be dependent on the voltage signal within the predetermined voltage interval. According to another embodiment, the out-of-band gradient is constant, i.e. independent of the voltage signal outside the predetermined voltage interval.

According to an embodiment, setting the reactive component is performed only if the voltage indicated by the voltage signal is outside the predetermined voltage band. According to still another embodiment, setting the reactive component is performed irrespective of the voltage indicated by the voltage signal, i.e. inside and outside the predetermined voltage band. In this case, a reactive current gradient is applied inside and outside the predetermined voltage band.

Generally herein, the term "setting" is to be interpreted in a broad sense. For example setting a certain quantity (e.g. an active component, a reactive component, etc.) depending on a voltage signal includes e.g. setting the quantity depending on the voltage signal at defined time intervals, varying the quantity in response to a varying voltage signal, etc. In particular "setting a reactive component depending on a voltage signal" includes e.g. setting the reactive component depending on the voltage signal at defined time intervals, varying the reactive component in response to a varying voltage signal, etc.

According to an embodiment, the controller is configured for setting the reactive component so as to drive the voltage of its phase towards the predetermined voltage band. Further, according to another embodiment, the controller may be configured for varying the reactive component in a stepwise manner in response to the voltage signal, even if the voltage signal is a continuously varying signal. For example, in an embodiment, if the voltage of the respective phase reaches the boundary of the predetermined voltage band, the reactive component, e.g. the reactive current, may be set to a predetermined value, e.g. to zero. According to other embodiments, the controller of at least one phase is configured for varying the reactive component continuously over the boundary of the predetermined voltage band as a function of the voltage signal.

It should be mentioned that whenever the controller takes into account current signals, a respective current measuring unit is provided in order to measure a current signal representative of the current or the electrical output power, which current signal is taken into account by the controller.

According to a further embodiment, the at least one controller is configured for controlling the reactive component of its phase according to an in-band gradient if the voltage indicated by the voltage signal is inside the predetermined voltage interval and for controlling the reactive component of its phase according to an out-of-band gradient if the voltage indicated by the voltage signals outside the predetermined voltage interval.

According to a further embodiment, the in-band gradient is different from the out-of-band gradient. According to a further embodiment, the gradient is specified as a percentage value, wherein for example a value of 2% reactive current gradient means that a 1% change in the voltage indicated by the voltage signal results in a 2% change in the reactive component. It should be noted that according to an embodiment, the sign of the gradient is such that the voltage of the electrical output power is driven towards the predetermined voltage interval.

According to an embodiment, the actual value of the reactive component at the boundary of the predetermined voltage interval (according to the in-band control of the reactive component) is used as starting point for the application of the out-of-band gradient. According to another embodiment, the controller is configured for setting the value of the reactive component at the boundary of the predetermined voltage interval to a predetermined value, e.g. zero (amperes). This may result in a change of the reactive component at the boundary of the predetermined voltage interval in a stepwise manner.

According to an embodiment of the first aspect, the converter device comprises a control input for receiving a gradient control signal, wherein the controller is configured for setting at least one of the out-of-band gradient and the in-band gradient of the controller in response to the gradient control signal.

According to a second aspect of the herein disclosed subject-matter, a power plant is provided, the power plant comprising a converter device according to the first aspect or an embodiment thereof.

According to an embodiment of the second aspect, the power plant further comprises a power generator for generating the electrical input power. For example, according to an embodiment, the power generator is an electrical generator of a wind turbine. According to another embodiment, the power generator is a solar energy module. However, it should be understood that any power generator may be used with the converter device according to the herein disclosed subject-matter. According to a further embodiment of the second aspect, the power plant comprises a power plant controller for providing at least one control signal to the controller of the converter device, e.g. a gradient control signal for setting at least one of the in-band reactive current gradient and the out-of-band reactive current gradient.

Controlling the out-of-band reactive current gradient may allow e.g. for adaption of the reactive current contribution outside the predetermined voltage band to a network impedance of the electricity network. According to an embodiment, the power plant controller is be configured for automatic optimisation of the out-of-band gradient and/or the in-band gradient.

According to a third aspect of the herein disclosed subject-matter, a method for converting an input power to an electrical output power is provided, the method comprising (i) receiving a voltage signal, the voltage signal being indicative of a voltage in an electricity network to which the electrical output power is supplied, and (ii) setting a reactive component to a value which depends on the voltage signal and on an out-of-band reactive current gradient if the voltage indicated by the voltage signal is outside a predetermined voltage band, wherein the out-of-band reactive current gradient is defined as change of reactive component per voltage unit of a change in the voltage indicated by the voltage signal.

According to an embodiment of the third aspect, the reactive component is set according to an in-band gradient if the voltage indicated by the voltage signal is inside a predetermined voltage interval.

According to a further embodiment of the third aspect, the reactive component is varied continuously over the boundary of the predetermined voltage interval. According to another embodiment, the reactive component is varied in a stepwise manner over the boundary of the predetermined voltage interval, wherein the starting point outside the predetermined voltage interval may be a predetermined reactive component value.

According to a fourth aspect of the herein disclosed subject-matter, a method for operating a power plant controller is provided, the method comprising providing a gradient control signal to the controller of a converter device, wherein the converter device is configured for converting an input power to an electrical output power, the control signal being configured for setting in the controller of the converter device an out-of-band reactive current gradient that is used by the converter device for controlling a reactive component of the electrical output power if a voltage indicated by a voltage signal is outside a predetermined voltage interval.

According to a fifth aspect of the herein disclosed subject-matter, a computer readable medium is provided, wherein on the computer readable medium there is stored a computer program for setting a reactive component of an electrical output power of a converter device, the computer program, when being executed by data processor, is adapted for controlling or for carrying out the method as set forth in the third aspect or an embodiment thereof.

According to a sixth aspect of the herein disclosed subject-matter a program element is provided, the program element being configured for setting a reactive component of an electrical output power of a converter device, the program element, when being executed by a data processor, is adapted for controlling or for carrying out the method as set forth in the third aspect or an embodiment thereof.

According to a seventh aspect of the herein disclosed subject-matter, a computer readable medium is provided, wherein on the computer readable medium there is stored a computer program for setting a reactive current gradient for an electrical output power of a converter device, the computer program, when being executed by data processor, is adapted for controlling or for carrying out the method as set forth in the fourth aspect or an embodiment thereof.

According to a eighth aspect of the herein disclosed subject-matter a program element is provided, the program element being configured for setting a reactive current gradient for an electrical output power of a converter device, the program element, when being executed by data processor, is adapted for controlling or for carrying out the method as set forth in the fourth aspect or an embodiment thereof.

As used herein, reference to a program element and/or a computer readable medium is intended to be equivalent to a reference to a computer program containing instruction for controlling a computer system to coordinate the performance of the above described methods.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The herein disclosed subject matter may be realized by means of a computer program respectively software. However, the herein disclosed subject matter may also be realized by means of one or more specific electronic circuits respectively hardware. Furthermore, the invention may also be realized in a hybrid form, i.e. in a combination of software modules and hardware modules.

In the following, there will be described exemplary embodiments of the subject-matter disclosed herein with reference to a converter device and a method for converting an input power into an electrical output power. It has to be pointed out that of course any combination of features relating to different aspects of the herein subject-matter is also possible. In particular, some embodiments have been described with reference to apparatus type claims whereas other embodiments have been described with reference to method type claims. However, a person skilled in the art will gather from the above and the following description that, unless otherwise notified, in addition to any combination of features belonging to one aspect also any combination between features relating to different aspects or embodiments, for example even between features of the apparatus type claims and the features of the method type claims, as well as between features relating to the converter device and features relating to a power plant is considered to be disclosed with this application.

The aspects and embodiments defined above and further aspects and embodiments of the herein disclosed subject-matter are apparent from the examples to be described hereinafter and are explained with reference to the drawings but to which the invention is not limited.

BRIEF DESCRIPTION OF THE DRAWINGS

FIG. 2 schematically shows the changes in reactive component versus voltage signal for an exemplary phase of a converter device in according with embodiments of the herein disclosed subject-matter.

DETAILED DESCRIPTION

Figure 1:
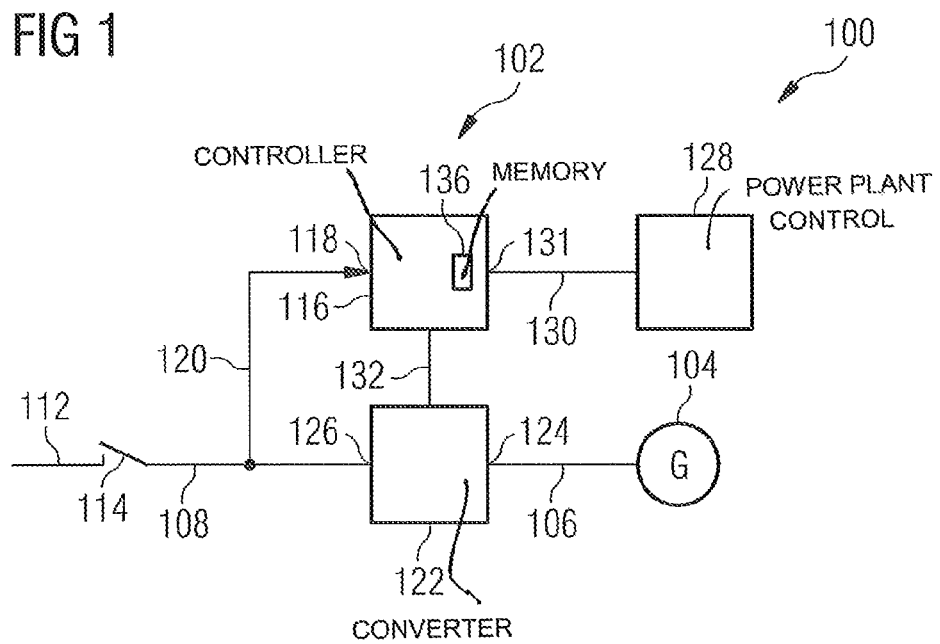
FIG. 1 shows schematically a power plant in accordance with embodiments of the herein disclosed subject-matter.

The illustration in the drawings is schematic. It is noted that in different figures, similar or identical elements are provided with the same reference signs or with reference signs, which are different from the corresponding reference signs only within an appended character.

FIG. 1 shows schematically a part of the power plant 100 according to embodiments of the herein disclosed subject-matter. The power plant 100 comprises a converter device 102 in the form of an electrical converter device and a power generator 104. As used herein, the term "electrical converter device" relates to an embodiment wherein the input power of the converter device is electrical power.

The converter device 102 is configured for converting an electrical input power 106 supplied by the power generator 104 into an electrical output power, indicated at 108 in FIG. 1. The electrical output power 108 is coupleable with an electricity network which is indicated at 112 in FIG. 1. According to an embodiment, the electricity network 112 is a grid. Coupling of the converter device 102 in this manner with the electricity network 112 may be performed by any suitable means, e.g. a main switch 114 in one embodiment. It should be noted, that although the main switch 114 is in an open state in FIG. 1, in operation, the main switch 114 will be closed, thereby coupling the power plant 100 to the electricity network 112.

Further, the converter device comprises a voltage input or measuring input 118 for receiving a voltage signal indicative of a voltage in the electricity network 112. Each voltage signal may be part of a feedback signal which includes the voltage signal and at least on further quantity, e.g. a current signal indicative of a current of the electrical output power 108. This current indicated by the current signal may be an active current, a reactive current or a total (complex) current including the active current and the reactive current.

According to an embodiment, the power plant 100 operates inside the voltage dead band with voltage control, which means that the power factor of the electrical output power 108 is varied depending on the voltage signal 120 so as to keep the voltage at a constant value, at least within certain limits, e.g. within the boundaries of the predetermined voltage band. If the voltage indicated by the voltage signal 120 leaves the predetermined voltage band (overshot or undershoot), a reactive component is varied so as to vary the reactive current according to a predetermined out-of-band gradient. According to an embodiment, the reactive current is changed by the controller 116 according to the predetermined gradient, outside the dead band and optionally also inside the dead band. In the following, the predetermined reactive current gradient inside the dead band is referred to as in-band gradient and the reactive current gradient outside the dead band is referred to as out-of-band gradient. According to an embodiment, the in-band gradient and the out-of-band gradient are different.

The reactive current provided at the output 126 of the converter 122 is, according to an embodiment, limited to the rated current of the converter. If the voltage indicated by the voltage signal 120 leaves the dead band (overshot or undershoot), the reactive current will follow the predetermined out-of-band gradient. According to an embodiment, the start value for the reactive current at the boundary of the dead band is zero amperes. This means that in this embodiment the reactive current jumps from the previous value inside the dead band to the predetermined start value for reactive current control according to the out-of-band gradient outside the dead band. Herein, the previous value inside the dead band is set according to the voltage control inside the dead band.

In order to effect the setting of the reactive current according to the voltage signal and the out-of-band gradient, a converter 122 is provided, e.g. in the form of a frequency converter.

According to an embodiment shown in FIG. 1, the converter 122 has an input 124 which is configured for receiving the electrical input power 106, e.g. a three-phase current.

According to other embodiments, the converter 122 may be configured for receiving a direct current electrical input power. Further, the converter 122 comprises an output 126 for providing the electrical output power 108. As shown in FIG. 1, the voltage which is to be detected in the electricity network 112 may be measured at the output 126 of the converter 122.

The power plant 100 further comprises a power plant controller 128 for providing control signals to the controller 116. The entirety of the control signals is denoted by 130 in FIG. 1 and may include e.g. a control signal for setting a desired power P, a control signal for setting the power slope dP/dt, corresponding to a certain change in power per time unit, and a control signal for setting a desired voltage Us.

The controller 116 comprises a control input 131 for receiving the at least one control signal 130 and controls its associated converter 122 with a respective converter control signal 132 and may optionally receive, according to an embodiment, a feedback signals (not shown in FIG. 1) from the converter 122.

The power plant 100 shown in FIG. 1 is part of a wind turbine, wherein the gears and the rotor of the wind turbine are coupled to the generator 104 for driving the generator 104, but are not shown in FIG. 1. In operation, the wind power plant controller 128 controls the voltage of the electrical output power 108 and will support the desired output voltage (and hence the voltage in the electricity network 112) by feed-in of reactive current into the electrical output power 108 depending on the voltage level indicated by the voltage signal 120.

According to an embodiment, the power plant 100 operates inside a predetermined voltage band with a constant reactive power factor. According to an embodiment, if the voltage (which is indicated by the voltage signal 120) leaves the predetermined voltage band (overshot or undershoot), the reactive current will be varied as a function of the magnitude of the voltage which is detected in the electricity network 112 (indicated by the voltage signal 120).

According to an embodiment, the power that can be delivered by the converter 122 is limited to a certain amount. For some converter types, the sum of the active current and the reactive current must be below this amount and hence the lower the active current, the higher can be the reactive current. However, these are limitations imposed by the design of the converter, which may vary widely with converter type and design.

Operating parameters such as the in-band gradient, the out-of-band gradient and the settings of the above mentioned control signals, etc. may be stored in a memory 136 of the controller 116. The respective settings in the memory 136 may be at least partly fixedly stored and/or may be Variable, e.g. by the power plant control 128. According to an embodiment, the power plant control 128 may continuously update the respective settings depending on actual properties such as the impedance of the electricity network. The impedance of the electricity network may be determined by a targeted injection of a reactive power for a short time and measurement of relevant parameters of the electricity network.

According to other embodiments such an update of the respective settings by the power plant control 128 may be initiated manually.

FIG. 2 exemplarily illustrates in-band control and out-of-band control of the reactive current according to embodiments of the herein disclosed subject matter. It should be understood that instead of the reactive current any other reactive component may be taken into account for controlling reactive current according to the out-of-band gradient and, optionally, the in-band gradient.

As mentioned above, the electrical output power 108 may be a three-phase electrical output power. According to an embodiment, for each phase an individual controller and an individual converter 122 may be provided. According to another embodiment, a single controller may be provided for all three phases.

FIG. 2 shows the out-of-band gradient 150a, 150b for the reactive current RC1 for one phase of the electrical output power 108 of FIG. 1. The out-of-band gradient 150a, 150b determines the amount of change in reactive current per unit change of voltage V1 of the one phase indicated by the voltage signal 120 of FIG. 1. The in-band gradient for the reactive current RC1 and the voltage V1 is indicated at 152 in FIG. 2. Positive values of the reactive current RC1 are indicated at pv in FIG. 2, wherein negative values are indicated at nv. Further illustrated in FIG. 2 is the predetermined voltage band ΔUb with a lower boundary 154 and an upper boundary 156 of the predetermined voltage band. According to an embodiment, the width 157 of the predetermined voltage band ΔUb is 5% of the rated value of the voltage V1. According to other embodiments, the width 157 may be set to any value in the interval between 0% and 20% of the rated voltage. According to other embodiments, other values are possible.

According to an embodiment, the in-band gradient 152 is offset from the origin 158 which is defined by voltage V1=rated voltage and reactive current RC1=0. The offset 159 of the in-band gradient is defined as the reactive current Io of the gradient curve 152 at the rated voltage (V1=rated voltage).

The actual value of the in-band gradient 152 and the actual value of the out-of-band gradient 150a150b are different in an embodiment. According to other embodiments, the in-band gradient 152 and the out-of-band gradient 150a, 150b are equal. According to a further embodiment, the value for at least one of the in-band gradient 152 and the out-of-band gradient 150a, 150b is temporally fixed. According to another embodiment, the value for at least one of the in-band gradient 152 and the out-of-band gradient 150a, 150b is changeable, e.g. by respective gradient control signals from e.g. the power plant controller 128 shown in FIG. 1. According to an embodiment, the out-of-band gradient is changeable within a predetermined gradient interval, indicated at 160 in FIG. 2, e.g. within the interval from 1% to 4%. Herein, a gradient of e.g. x % defines the reactive current RC1 to be changed by x % for a detected 1% change of the voltage V1. It should be understood that the reactive current and the voltage of the one phase are referenced here only for illustrative purposes.

In a similar manner the in-band gradient 152 may be defined and may be settable to a value in the same gradient interval or in a different gradient interval.

According to embodiments of the invention, any suitable component of the power plant or of the converter device, e.g. the controller, is provided in the form of respective computer program products which enable a processor to provide the functionality of the respective elements as disclosed herein. According to other embodiments, any component of the power plant or of the converter device, e.g. the controller, may be provided in hardware. According to other—mixed—embodiments, some components may be provided in software while other components are provided in hardware.

The functionality provided by embodiments of the herein disclosed subject matter may be imposed on an existing converter device/existing power plant controller by means of a software update, firmware update, or the like.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate the above described embodiments of the present invention one can state:

It is described a converter device for power conversion in e.g. a power plant such as a wind turbine. The converter device is configured for converting an electrical input power to an electrical output power. The converter device may be configured for receiving mechanical input power or, according to another embodiment, may be configured for receiving electrical input power. Further, the converter device comprises a voltage input for receiving a voltage signal, said voltage signal being indicative of a voltage in a electricity network to which the converter device is coupled during operation in order to provide said electrical output power to said electricity network. Further, the converter device comprises a controller being configured for setting a reactive component of said electrical output power depending on said voltage signal according to a out-of-band reactive current gradient if the voltage indicated by the voltage signal is outside a predetermined voltage band. The out-of-band reactive current gradient is defined as change of reactive current per voltage unit of a change in the voltage indicated by the voltage signal.

Embodiments of the herein disclosed subject matter result in a more stable electricity network. The voltage will be more constant and therefore the influence on the electricity network especially during changes in the wind speed will be reduced or even minimized. The voltage setpoint can be set to a value which is (slightly) higher than the rated voltage of the electricity network in order to compensate for some normal reactive power consumers in the collector grid or in the cables and transformers: Thereby the losses in the power plant can be reduced. Further, switching operations of a tab changer at the transformer station will be reduced. Thereby, the life time of the tab changer will be increased.

According to an embodiment, the gradient for the reactive current outside the predetermined voltage interval is changed via online access to the power plant. This could be done e.g. by a grid operator.

The invention claimed is:

1. A converter device for converting an electrical input power to an electrical output power, the converter device comprising:
  a voltage input for receiving a voltage signal, said voltage signal being indicative of a voltage in an electricity network to which the converter device is coupled during operation in order to provide said electrical output power to said electricity network;
  a controller being configured for setting a reactive component of said electrical output power depending on said voltage signal according to a predetermined out-of-band reactive current gradient if the voltage indicated by the voltage signal is outside a predetermined voltage band, thereby varying the reactive component so as to vary a reactive current according to the predetermined out-of-band reactive current gradient;
  wherein the predetermined out-of-band reactive current gradient is defined as change of reactive current per voltage unit of a change in the voltage indicated by the voltage signal,
  wherein the predetermined voltage band is set to a width which varies as a percentage of a rated value of the voltage signal.

2. The converter device according to claim 1,
wherein said reactive component is selected from a group consisting of: a reactive current, a reactive power, a phase angle between voltage and total current of the electrical output power, and a power factor.

3. The converter device according to claim 1,
wherein said controller is configured for setting the reactive component of said electrical output power according to an in-band reactive current gradient if the voltage indicated by the voltage signal is inside the predetermined voltage band;
wherein the in-band reactive current gradient is defined as change of reactive component per voltage unit of a change in the voltage indicated by the voltage signal.

4. The converter device according to claim 3, wherein the in-band reactive current gradient and the predetermined out-of-band reactive current gradient are different.

5. The converter device according to claim 4, further comprising:
a control input for receiving a gradient control signal, wherein the controller is configured for setting at least one of the in-band reactive current gradient and the out-of-band reactive current gradient in response to the gradient control signal.

6. The converter device according to claim 3, further comprising:
a control input for receiving a gradient control signal, wherein the controller is configured for setting at least one of the in-band reactive current gradient and the out-of-band reactive current gradient in response to the gradient control signal.

7. The converter device according to claim 1,
wherein the controller is configured for setting the reactive component at a boundary of the predetermined voltage band to a predetermined value.

8. The converter device according to claim 1 or 2 or 7, further comprising:
a control input for receiving a gradient control signal, wherein the controller is configured for setting at least one of an in-band reactive current gradient and the predetermined out-of-band reactive current gradient in response to the gradient control signal.

9. A power plant, comprising:
a converter device, comprising:
a voltage input for receiving a voltage signal, said voltage signal being indicative of a voltage in an electricity network to which the converter device is coupled during operation in order to provide said electrical output power to said electricity network;
a controller being configured for setting a reactive component of said electrical output power depending on said voltage signal according to a predetermined out-of-band reactive current gradient if the voltage indicated by the voltage signal is outside a predetermined voltage band, thereby varying the reactive component so as to vary a reactive current according to the predetermined out-of-band reactive current gradient;
wherein the predetermined out-of-band reactive current gradient is defined as change of reactive current per voltage unit of a change in the voltage indicated by the voltage signal, and
wherein a width of the predetermined voltage band varies as a percentage of a rated value of the voltage signal.

10. The power plant according to claim 9, further comprising:
a power plant controller for providing to the converter device a control signal for setting at least one of an in-band reactive current gradient and the out-of-band reactive current gradient.

11. A method for converting an electrical input power to an electrical output power, the method comprising:
receiving a voltage signal, said voltage signal being indicative of a voltage in an electricity network to which said electrical output power is supplied;
setting a reactive component of said electrical output power to a value depending on said voltage signal and a predetermined out-of-band reactive current gradient if the voltage indicated by the voltage signal is outside a predetermined voltage band, thereby varying the reactive component so as to vary a reactive current according to the predetermined out-of-band reactive current gradient;
wherein the predetermined out-of-band reactive current gradient is defined as change of reactive current per voltage unit of a change in the voltage indicated by the voltage signal, and
wherein a width of the predetermined voltage band varies as a percentage of a rated value of the voltage signal.

12. A method for operating a power plant controller, the method comprising:
providing a control signal to a controller of a converter device, wherein the converter device is configured for converting an input power to an electrical output power;
the control signal being configured for setting in the controller of the converter device a predetermined out-of-band reactive current gradient that is used by the converter device for controlling a reactive component of the electrical output power if a voltage indicated by a voltage signal is outside a predetermined voltage interval, thereby varying the reactive component so as to vary a reactive current according to the predetermined out-of-band reactive current gradient,
wherein the predetermined out-of-band reactive current gradient is defined as change of reactive current per voltage unit of a change in the voltage indicated by the voltage signal, and
wherein a width of the predetermined voltage band varies as a percentage of a rated value of the voltage signal.

* * * * *